(No Model.)
D. J. SCHNEIDER.
PICKET FENCE.
No. 460,221. Patented Sept. 29, 1891.
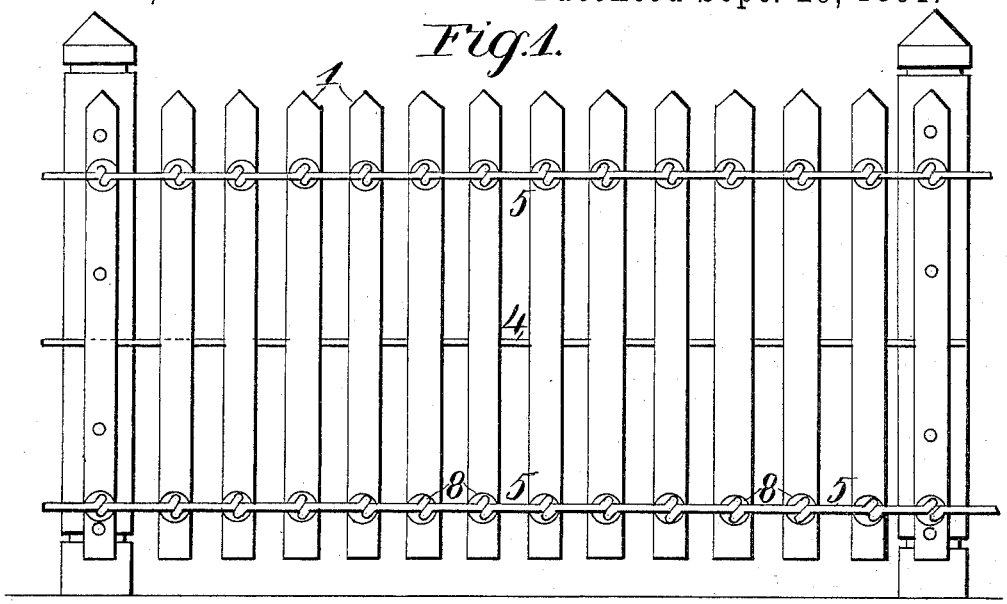
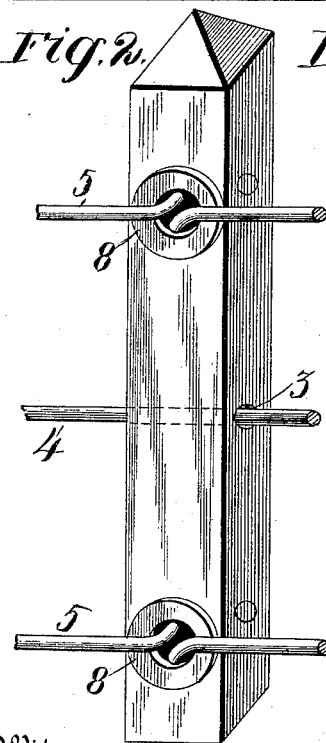
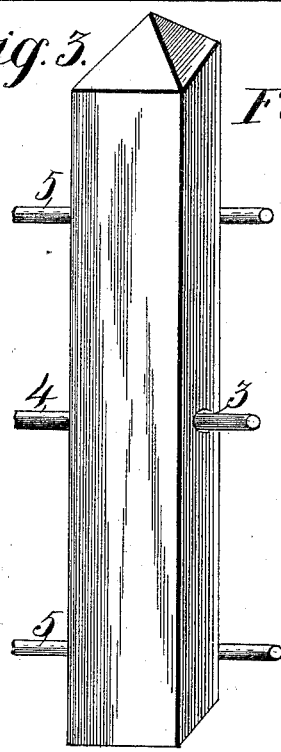
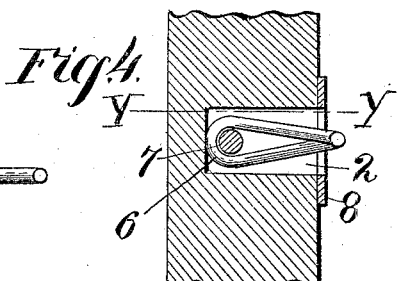
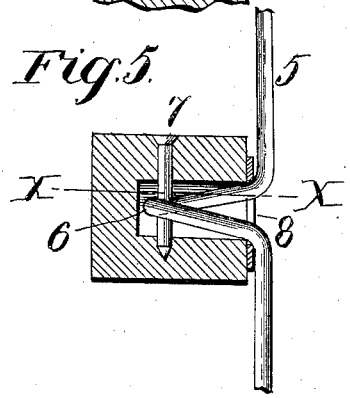
Witnesses
D. J. Keller
Edward E. Longan
Inventor
Daniel J. Schneider
By his Attorneys Higdon & Higdon

United States Patent Office.

DANIEL J. SCHNEIDER, OF ST. LOUIS, MISSOURI.

PICKET FENCE.

SPECIFICATION forming part of Letters Patent No. 460,221, dated September 29, 1891.

Application filed February 9, 1891. Serial No. 380,769. (No model.)

*To all whom it may concern:*

Be it known that I, DANIEL J. SCHNEIDER, of the city of St. Louis and State of Missouri, have invented certain new and useful Improvements in Picket Fences, of which the following is a full, clear, and exact description, reference being had to the accompanying drawings, forming a part hereof.

My invention relates to improvements in picket fences; and it consists in the novel arrangement and combination of parts, as will be more fully hereinafter described, and designated in the claim.

In the drawings, Figure 1 is a rear view of a fence-panel constructed in accordance with my invention. Fig. 2 is a rear perspective view of my invention, showing a paling applied to wire railings. Fig. 3 is a front perspective view of the same. Fig. 4 is a cross-section taken on the line $x$ $x$ of Fig. 5, and Fig. 5 is a cross-section taken on the line $y$ $y$ of Fig. 4.

Referring to the drawings, 1 indicates a series of palings, which are provided near their terminal portions with depressions 2. Said depressions do not pass through the entire thickness of the paling, thereby making the same stronger than if they did, and also do not mar or disfigure the front surface of the paling. Said palings are provided near their median portions with perforations 3, through which a straight-wire railing is adapted to pass in the operation of constructing the fence.

4 indicates a straight-wire railing, which is adapted to pass through perforations 3, formed in the palings.

5 indicates wire railings, which are bent at intervals, thereby forming a series of loops 6. Said loops are adapted to fit in depressions 2, formed in the palings, and are secured therein by means of nails or screws 7, which pass through or partially through said palings and into the eyelet of the loop, as shown in Figs. 4 and 5. Said loops may be twisted, as shown in Fig. 5, if desired.

8 indicates a series of washers, which are placed in building and constructing the fence over loops 6 and are interposed between the face of the palings and the body of the wire railings, as shown in Figs. 1, 2, 4, and 5. Said washers give a finished appearance and assist in preventing the access of water into the depressions, which would tend to decay the palings and also assist in preventing the palings from being split when the railings are tightened.

I can construct any desired amount of fencing and nail or secure the same to the fence-posts 9, as shown in Fig. 1. The middle wire 4 passes through the median portion of the palings, as shown in Figs. 2 and 3.

I preferably construct my invention out of square palings; but I could use any size or form desired without materially departing from the nature of my invention.

Having fully described my invention, what I claim is—

The combination, in a fence, of pickets provided near their terminal portions with depressions and near their central portions with perforations, as shown, wire railings provided with loops adapted to be inserted in said perforations and secured by nails, washers adapted to be passed over said loops and interposed between the body of said wire railings and the faces of the palings, and a straight wire adapted to pass through the perforations formed in said pickets or palings, substantially as set forth.

In testimony whereof I affix my signature in presence of two witnesses.

DANIEL J. SCHNEIDER.

Witnesses:
E. E. LONGAN,
C. F. KELLER.